(12) United States Patent
Carlier (10) Patent No.: US 10,450,019 B2
(45) Date of Patent: Oct. 22, 2019

(54) CYCLE INSERTION LOCK, CYCLE BOARD COMPUTER, CYCLE, MOBILE COMMUNICATION DEVICE, USER ACCESS SERVER, USER ACCESS SYSTEM AND DATA CARRIER

(71) Applicant: Carlier Group B.V., Amsterdam (NL)

(72) Inventor: Ties Jonan Carlier, Amsterdam (NL)

(73) Assignee: VanMoof B.V., Amsterdam (NL)

( * ) Notice: Subject to any disclaimer, the term of this patent is extended or adjusted under 35 U.S.C. 154(b) by 0 days.

(21) Appl. No.: 15/558,018

(22) PCT Filed: Mar. 14, 2016

(86) PCT No.: PCT/NL2016/050183
§ 371 (c)(1),
(2) Date: Sep. 13, 2017

(87) PCT Pub. No.: WO2017/160140
PCT Pub. Date: Sep. 21, 2017

(65) Prior Publication Data
US 2018/0290702 A1    Oct. 11, 2018

(30) Foreign Application Priority Data

Mar. 13, 2015  (NL) .................................... 2014457
Mar. 14, 2016  (NL) .................................... 2016432

(51) Int. Cl.
*B62H 5/00*    (2006.01)
*B62J 99/00*   (2009.01)
(Continued)

(52) U.S. Cl.
CPC ............. *B62H 5/003* (2013.01); *B62J 99/00* (2013.01); *B62K 19/40* (2013.01); *E05B 41/00* (2013.01); *E05B 47/0004* (2013.01); *E05B 47/0012* (2013.01); *E05B 47/0603* (2013.01); *E05B 71/00* (2013.01); *E05B 73/0005* (2013.01);
(Continued)

(58) Field of Classification Search
None
See application file for complete search history.

(56) References Cited

U.S. PATENT DOCUMENTS 9,013,301 B2 *  4/2015  Williams ................. B62H 5/00
                                              340/539.13
10,053,889 B1 *  8/2018  Maratos ................ E05B 45/005

FOREIGN PATENT DOCUMENTS

| CH | 702432 A2 | 6/2011 |
| DE | 202015004358 U1 | 10/2015 |
| KR | 20150127340 A | 11/2015 |

* cited by examiner

Primary Examiner — K. Wong
(74) Attorney, Agent, or Firm — The Webb Law Firm (57) ABSTRACT

The present invention relates to a cycle frame insertion lock with electrical actuation suitable or configured for co-action with a cycle on-board computer configured to provide user access to the cycle. The cycle frame insertion lock includes a lock body, an insertion member receiving assembly comprising an insertion channel for receiving an insertion member, locking means for locking the insertion member in the insertion channel, actuating means for actuating the locking means, and a connector for connecting the actuating means to a cycle on-board computer. The actuating means can be actuated by means of an actuation, such as an actuating signal, initiated in the cycle on-board computer.

22 Claims, 10 Drawing Sheets

(51) Int. Cl.
  *B62K 19/40* (2006.01)
  *E05B 41/00* (2006.01)
  *E05B 47/06* (2006.01)
  *E05B 81/08* (2014.01)
  *G07C 9/00* (2006.01)
  *E05B 71/00* (2006.01)
  *E05B 47/00* (2006.01)
  *E05B 73/00* (2006.01)
(52) U.S. Cl.
  CPC .......... *E05B 81/08* (2013.01); *G07C 9/00571* (2013.01); *B62J 2099/0013* (2013.01)

CYCLE INSERTION LOCK, CYCLE BOARD COMPUTER, CYCLE, MOBILE COMMUNICATION DEVICE, USER ACCESS SERVER, USER ACCESS SYSTEM AND DATA CARRIER

CROSS-REFERENCE TO RELATED APPLICATIONS

This application is the United States national phase of International Application No. PCT/NL2016/050183 filed Mar. 14, 2016, and claims priority to Dutch Patent Application Nos. 2014457 and 2016432, both filed Mar. 13, 2015, the disclosures of which are hereby incorporated in their entirety by reference.

BACKGROUND OF THE INVENTION

Field of the Invention

The present invention relates to a cycle frame insertion lock with electrical actuation suitable or configured for co-action with a cycle on-board computer configured to provide user access to the cycle. The present invention also relates to a cycle on-board computer with user access functions configured to control a cycle frame insertion lock according to the present invention. The present invention further relates to a cycle comprising a cycle frame tube, or a cycle frame tube, comprising a passage opening for carrying therethrough an insertion member with a cycle frame insertion lock according to the present invention received therein. The present invention further relates to a mobile communication device with control functions for controlling a cycle on-board computer according to the present invention. The present invention further relates to a user access server comprising means for providing information to a mobile communication device for the purpose of activating user access functions configured for control of a cycle frame lock by an on-board computer of a cycle. The present invention further relates to a user access system for a cycle according to the present invention. The present invention also relates to a data carrier comprising instructions.

Description of Related Art

Many types of cycle lock are known for use with cycles. The present inventor already invented the tube lock for this purpose at an earlier stage. The use-case of such a lock relates to the application of conventional keys with an associated convenience of use.

SUMMARY OF THE INVENTION

In order to improve the prior art, the present invention relates to a cycle frame insertion lock with electrical actuation suitable or configured for co-action with a cycle on-board computer configured to provide user access to the cycle, the cycle frame insertion lock comprising:
  a lock body,
  an insertion member receiving assembly comprising an insertion channel for receiving an insertion member,
  locking means for locking the insertion member in the insertion channel,
  actuating means for actuating the locking means,
  a connector for connecting the actuating means to a cycle on-board computer, wherein the actuating means can be actuated by means of an actuation, such as an actuating signal, initiated in the cycle on-board computer.

An advantage of the present invention is that the cycle frame insertion lock can be opened by applying the on-board computer without the use of a mechanical key. It becomes possible here to apply a variety of keys. It is for instance possible to apply an electronic key specific to the lock with a Bluetooth transmitter. It is also possible for instance to apply as key a mobile phone with an application suitable for the purpose. It is possible here to provide an application with a plurality of keys. It is also possible to provide a mobile phone with a temporary key for temporary use of a cycle with such a lock and such an on-board computer.

According to a first preferred embodiment, the actuating means and the locking means are configured to lock the insertion member in a voltage-free state, and wherein the actuating means and the locking means are configured to release the insertion member by means of a voltage controlled from the cycle on-board computer.

According to a further preferred embodiment, the cycle frame insertion lock comprises an ejector member preferably also comprising biasing means for the purpose of providing an ejecting action. According to a variant, the ejector member is pushed out by means of a spring. The ejecting force is intended here to push out the ejector member under bias for the purpose of locking the locking means in a position suitable for admitting the insertion member. Little or no ejecting action is imparted here to the insertion member.

The actuating means more preferably comprise a solenoid for providing a path of movement for the locking means.

The locking means more preferably comprise here a direct and an indirect locking member.

The indirect locking means still more preferably co-act with the direct locking means in order to hold the direct locking means in the position locking the insertion pin, preferably in the absence of an actuating voltage from the cycle on-board computer.

A further aspect according to the present invention relates to a cycle on-board computer with user access functions configured to control a cycle frame insertion lock according to the present invention, comprising:
  a processing unit,
  a memory means,
  receiving means and/or input means for access information,
  access information processing means for processing access information for the purpose of determining, on the basis of the access information, whether to output an actuating signal,
  actuating signal output means for outputting the actuation signal.

According to a preferred embodiment, the receiving means here comprise radio receiving means, such as a Bluetooth or NFC receiver for receiving the access information.

The cycle on-board computer more preferably comprises here a GPS receiver and/or a cellular telephony receiver, such as a GSM receiver, for receiving respective GPS or cellular telephony signals for the purpose of performing a location determination, more preferably also comprising a cellular telephony transmitter.

A further aspect according to the present invention relates to a cycle comprising a cycle frame tube, or a cycle frame tube, comprising a passage opening for carrying therethrough an insertion member and having received therein a cycle frame insertion lock according to the present invention and a cycle on-board computer according to the present invention, wherein the cycle frame lock is mounted with an insertion channel such that the insertion channel is accessible by an insertion member through the passage opening.

A further aspect according to the present invention relates to a user access server comprising means for providing information to a mobile communication device for the purpose of activating user access functions configured for control of a cycle frame lock by an on-board computer of a cycle.

A further aspect according to the present invention relates to a user access system for a cycle according to the present invention with a lock according to the present invention, a cycle on-board computer according to the present invention, and comprising a user access server according to the present invention applying a mobile communication device according to the present invention.

A further aspect according to the present invention relates to a data carrier comprising instructions which, when executed on a processing unit, enable a device holding the processing unit to provide user access functions configured to control a cycle frame lock.

A further aspect according to the present invention relates to a data carrier comprising instructions which, when executed on a processing unit of a server, enable the server to provide information to a mobile communication device for the purpose of activating user access functions configured to control a cycle frame lock.

Further advantages, features and details of the present invention will be described in greater detail hereinbelow on the basis of one or more preferred embodiments with reference to the accompanying figures. Similar though not necessarily identical components of different preferred embodiments are designated with the same reference numerals.

DETAILED DESCRIPTION OF THE INVENTION

A first preferred embodiment (FIG. 1) according to the present invention relates to a cycle 1 comprising a cycle frame insertion lock 2. Cycle 1 also comprises an on-board computer 3 in an on-board computer assembly 3', a dynamo 7, a rear light 10, a front light 11 and a display screen assembly 12 with a control button 13 and an antenna 5.

Figure 1:
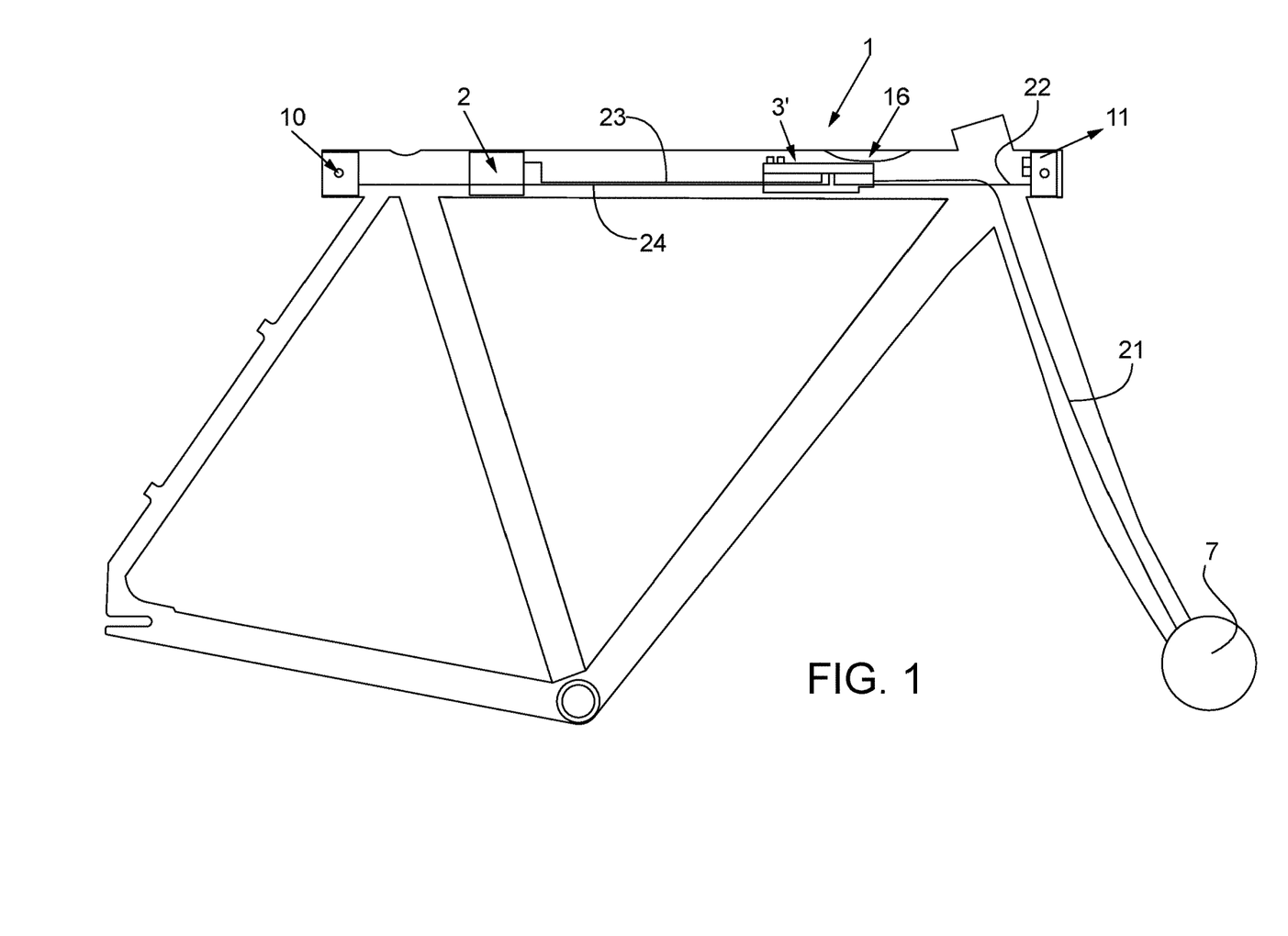
FIG. 1 is a schematic view of a cycle with a cycle frame insertion lock according to a first preferred embodiment according to the present invention.

Provided for the purpose of operating the lock 2 is a Bluetooth remote control 19 or mobile phone 14 comprising Bluetooth. The mobile phone is provided for this purpose with an application, or app, with which the on-board computer can be provided via the Bluetooth connection with information authorizing the user access or users access to the cycle, on the basis of which the on-board computer provides lock 2 with an actuating signal in the form of a power supply to the solenoid for activating the locking of the insertion pin.

Figure 2:
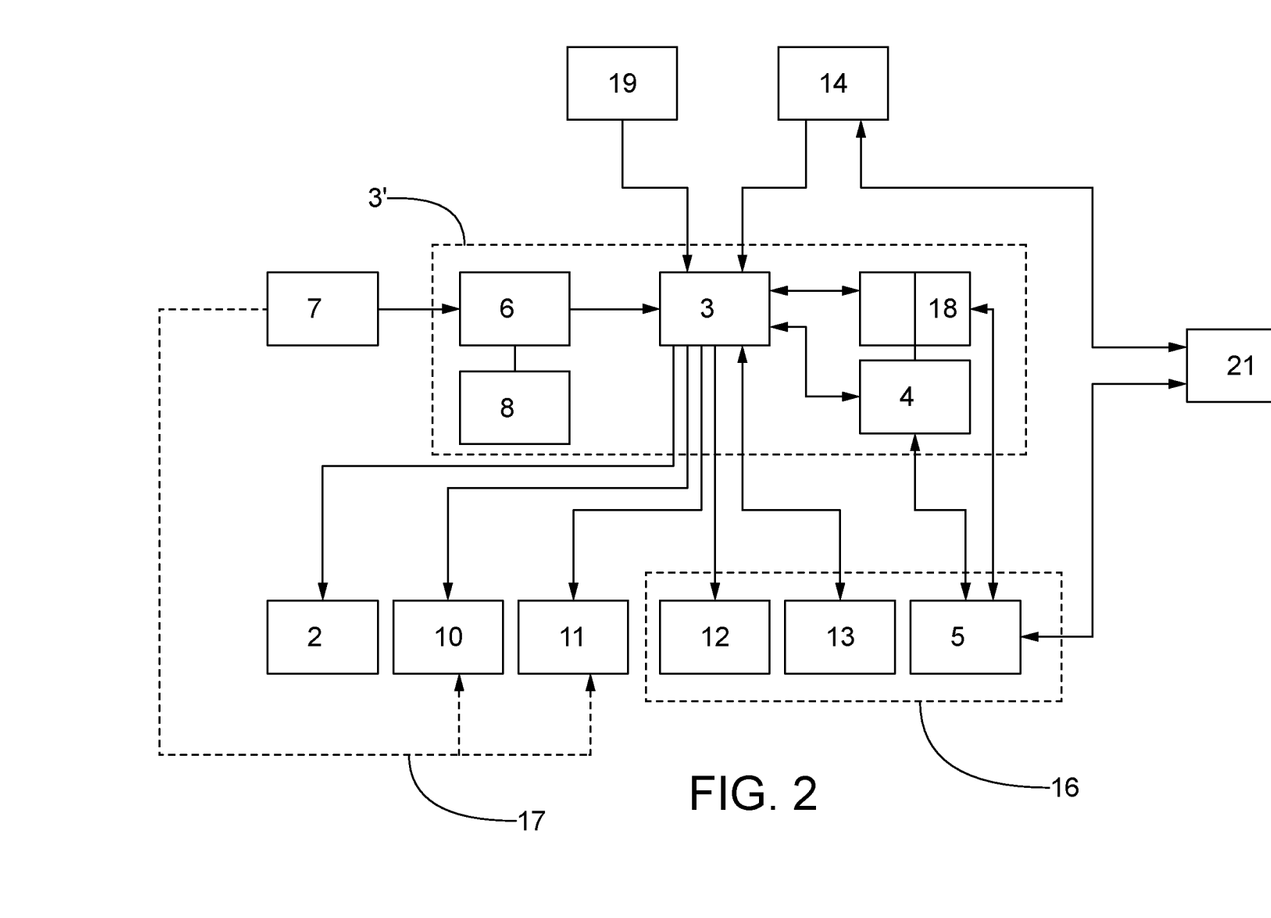
FIG. 2 is a schematic representation of components according to this preferred embodiment.

The on-board computer receives electrical energy from battery 6. Battery 6 is charged via a USB port, such as a micro-USB port or a USB type-C port, or via dynamo 7. Dynamo 7 also provides front light 11 and rear light 10 with energy under the control of on-board computer 3. A significant advantage of the dynamo is that the battery can be continuously charged during travel of the cycle. A further advantage of the dynamo is that, when the battery is exhausted, actuation of the lock is possible by rotating the front wheel while the cycle is stationary for the purpose of a brief energy supply.

On-board computer assembly 3' further comprises a receiver module 18 suitable for cellular networks such as GSM and related networks or CDMA networks. An advantage of such a receiver is that it can perform location determination both indoors and outdoors while consuming little energy. Also envisaged is the optional application of a GPS receiver for a more accurate outdoor location determination. Such a GPS receiver is preferably switchable on and off because of the relatively high energy consumption, but can be advantageous in the case of outdoor use.

Transmission of the location of the cycle to a server can be performed by means of the most recently connected mobile phone. Likewise envisaged is that the cellular module is itself provided with a GSM function, whereby it will in fact function as a transmitter/receiver.

Also provided is an RF module 4 for contact with an RF communication system, for instance for location determination on the basis of a stationary RF antenna or GSM masts 21 or other cycles.

In a dashboard assembly 16 display 12 is arranged together with an input button or input button assembly 13 and an antenna 5 for the purpose of said transmitting and receiving functions.

Figure 3:
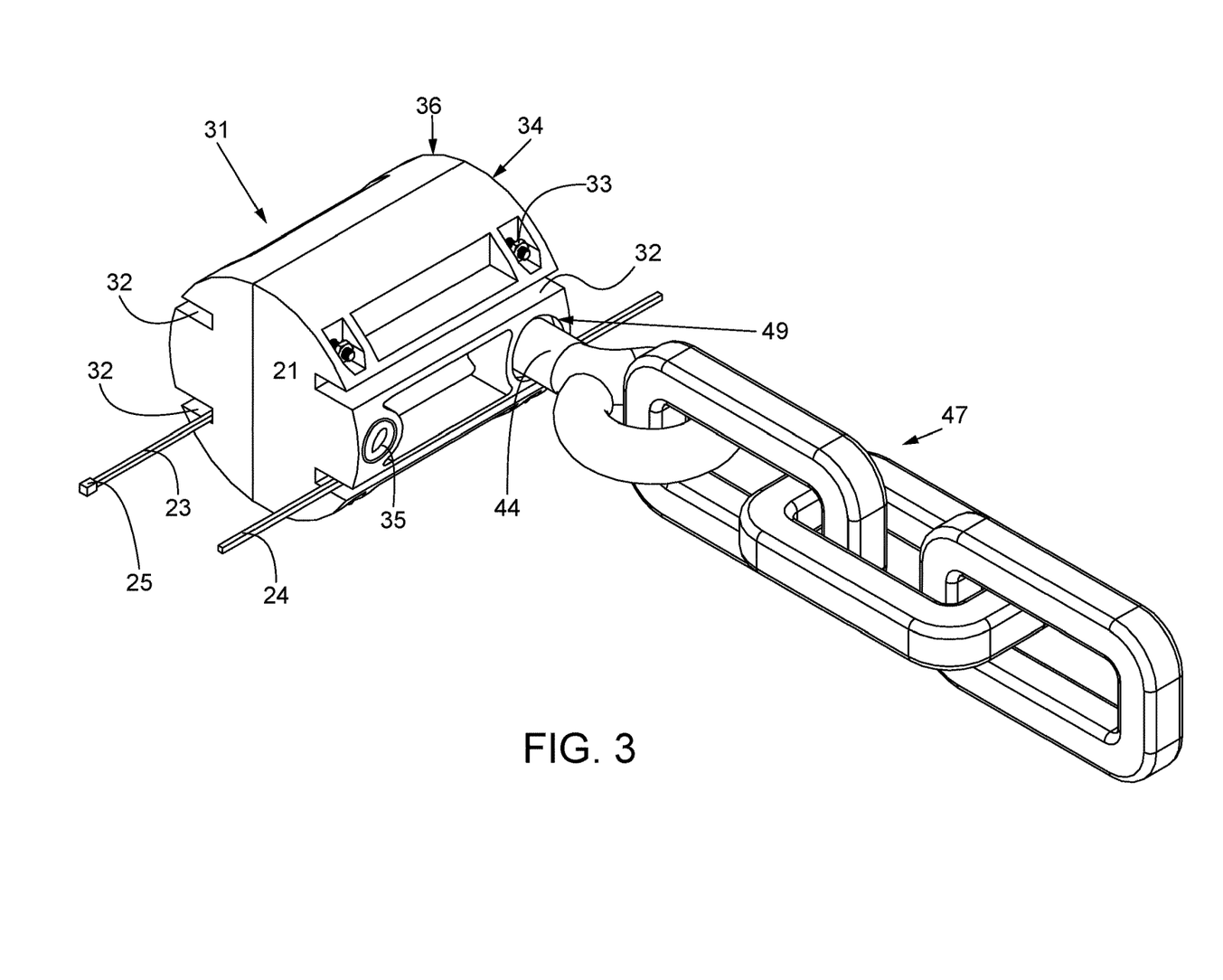
FIG. 3 is a schematic view of a preferred embodiment of the cycle frame insertion lock according to the present invention.

FIG. 3 is a perspective view of a preferred embodiment of a lock. There are two shells 34, 36 forming the housing of the lock. The shells are held together by means of bolts 33' with nuts 33 arranged in an opening suitable for the purpose. The housing has slots 32 for feeding cables therethrough. Shown are connecting cable 23 between the lock and the on-board computer with connector 25 for coupling to the on-board computer, and connecting cable 24 between the computer and the rear light.

Shown is the opening of an insertion channel 49 for insertion therein of an insertion pin 44 which is coupled to a chain 47 for fixing the cycle to an object such as a post or a fence.

Figure 4:
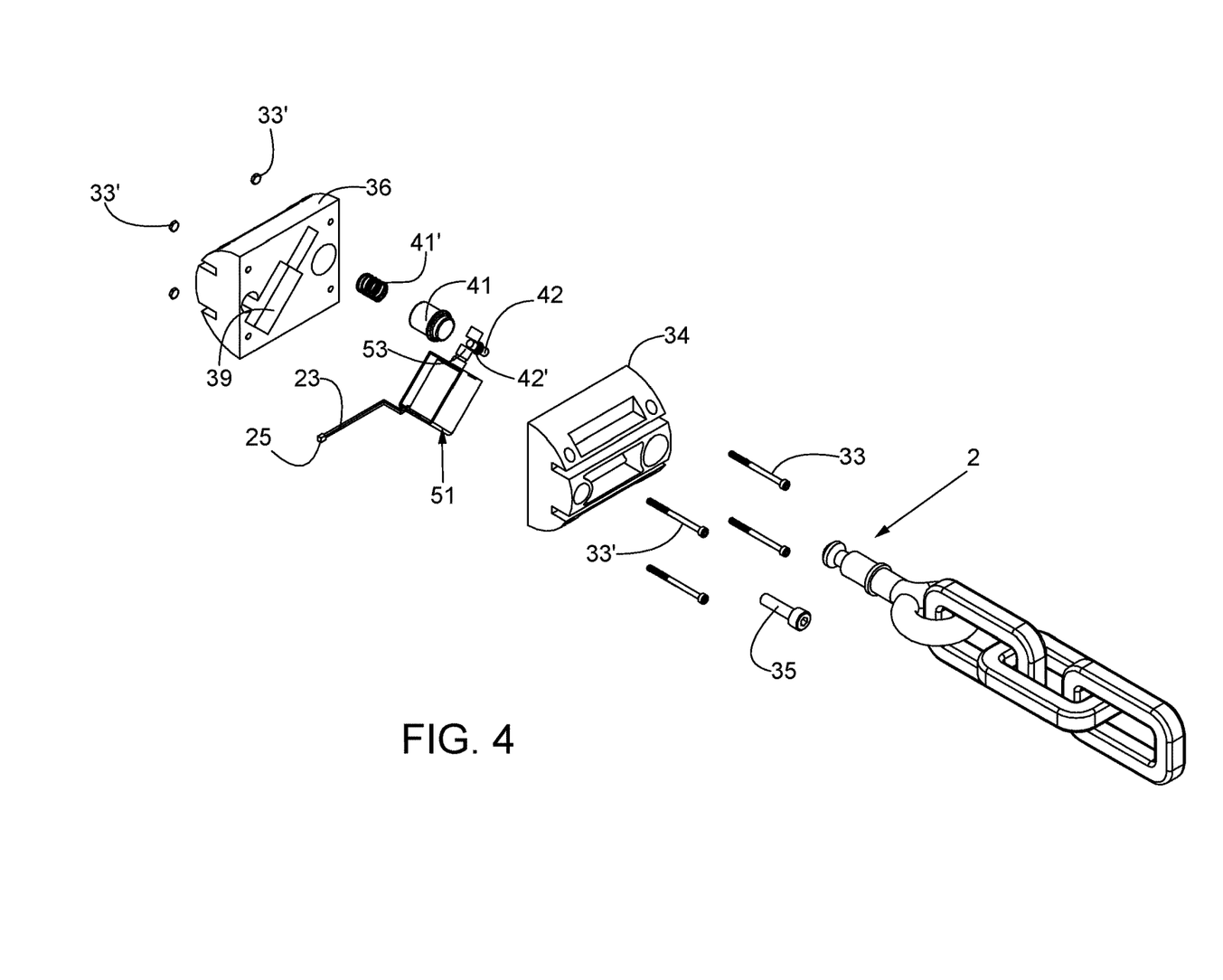
FIG. 4 is an exploded view of the preferred embodiment according to FIG. 3.
Figure 5A:
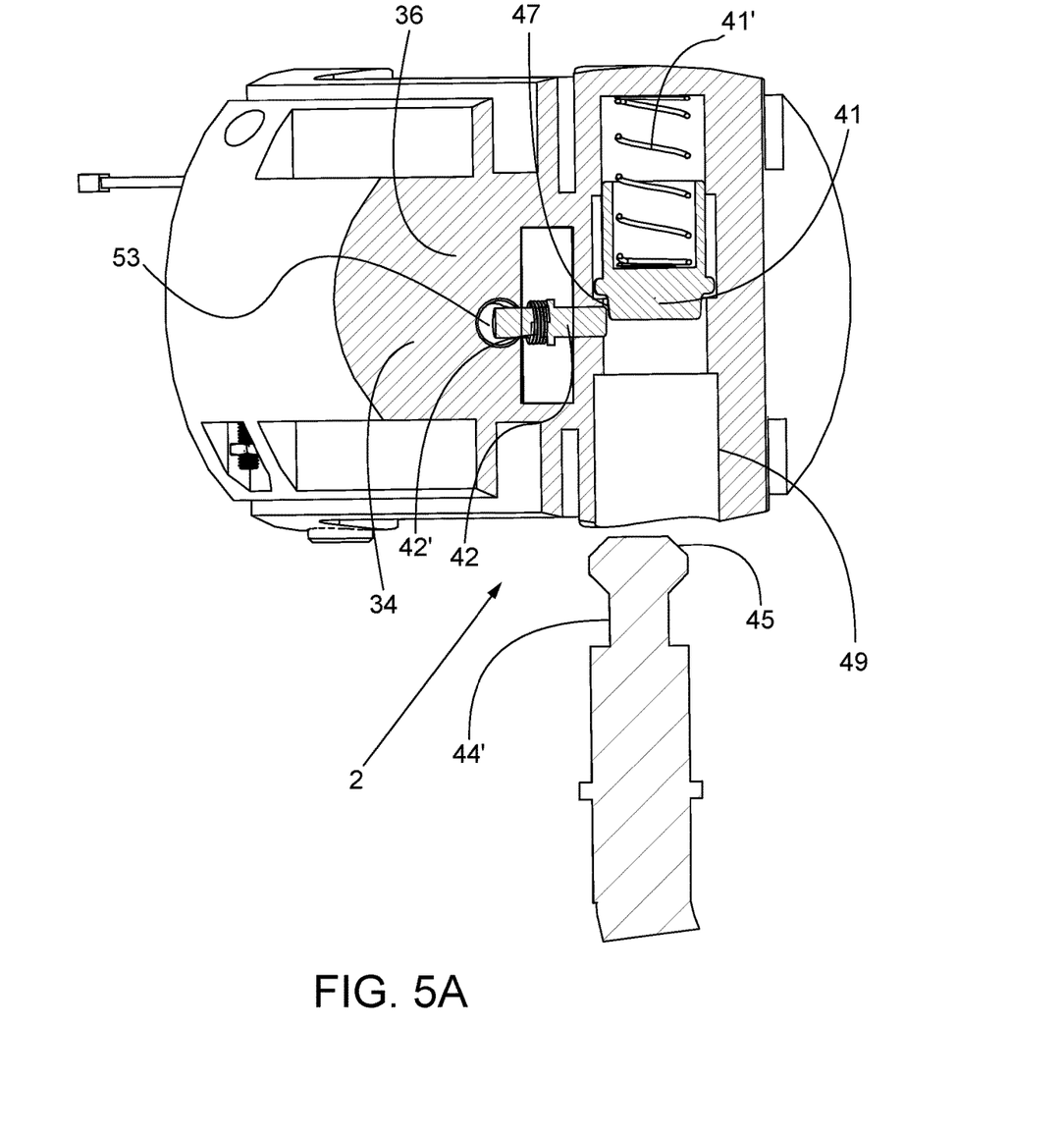
FIGS. 5A and B show a cross-section along a plane of section through the insertion channel and the primary locking pin.
Figure 5B:
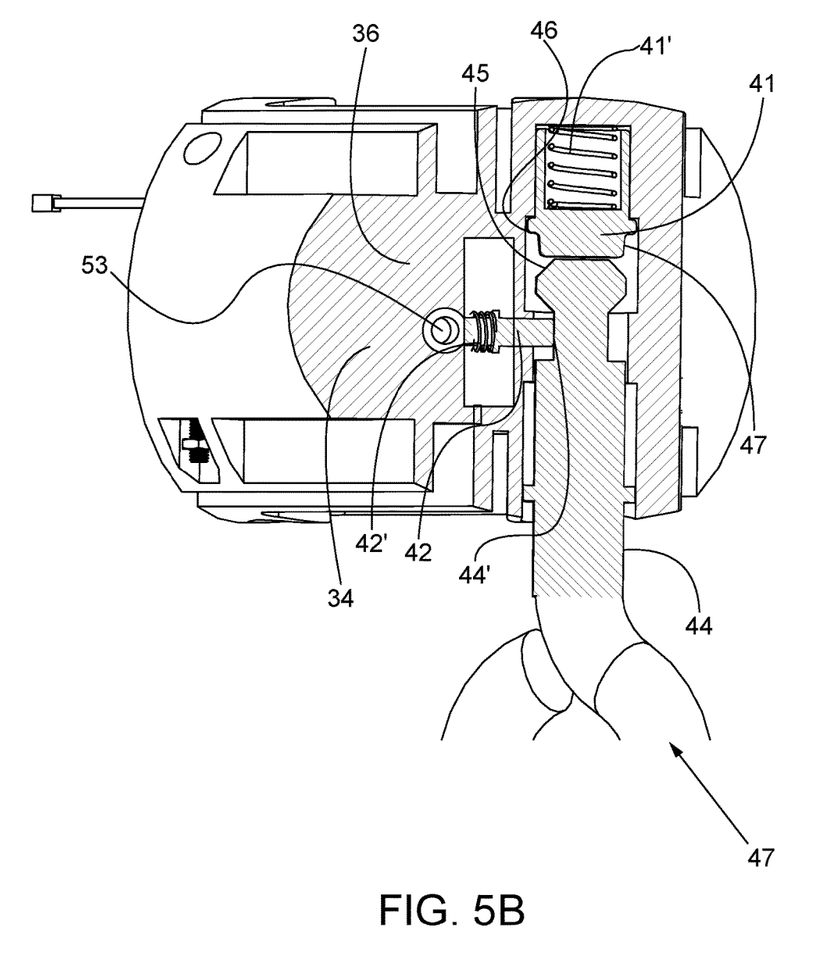

An exploded front view (FIG. 4) shows a space 39 for holding solenoid 51. Insertion pin 44 (FIG. 5) is provided with a constriction 44' and a head 45. Constriction 44' serves to receive the primary locking pin 42 which is urged in the direction of insertion pin 44 by means of a spring 42'. In the position of FIG. 5B insertion pin 44 is locked by means of locking pin 42, which is in turn locked by the magnetic housing of solenoid 51.

Insertion pin 44 can be pushed out of the channel by ejector member 41 under bias of a spring 41'. Ejector member 41 has a stop 46 which comes up against primary locking pin 42. Ejector member 41 hereby remains inside the channel. Ejector member 41 is further provided with a stop 48 against which the primary locking pin 42 connects when the insertion pin is pushed out. The primary locking pin hereby remains in its channel and pushing therefrom by spring 42' is prevented. Locking pin 42 and ejector member 41 hereby hold each other in functional positions.

Figure 6A:
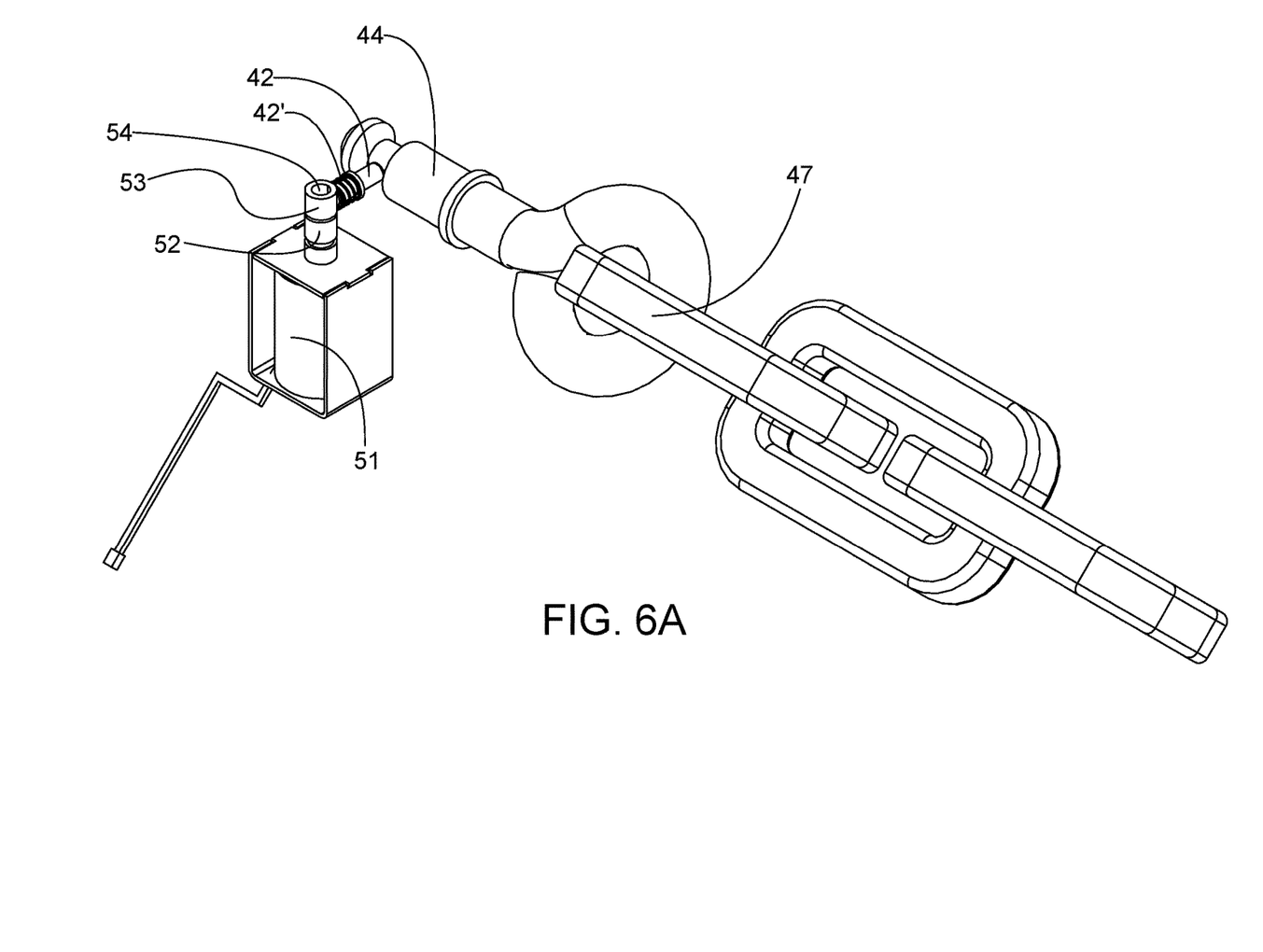
FIGS. 6A and B are perspective views of the solenoid, secondary and primary locking pin and the insertion pin according to the preferred embodiment of FIG. 3.
Figure 6B:
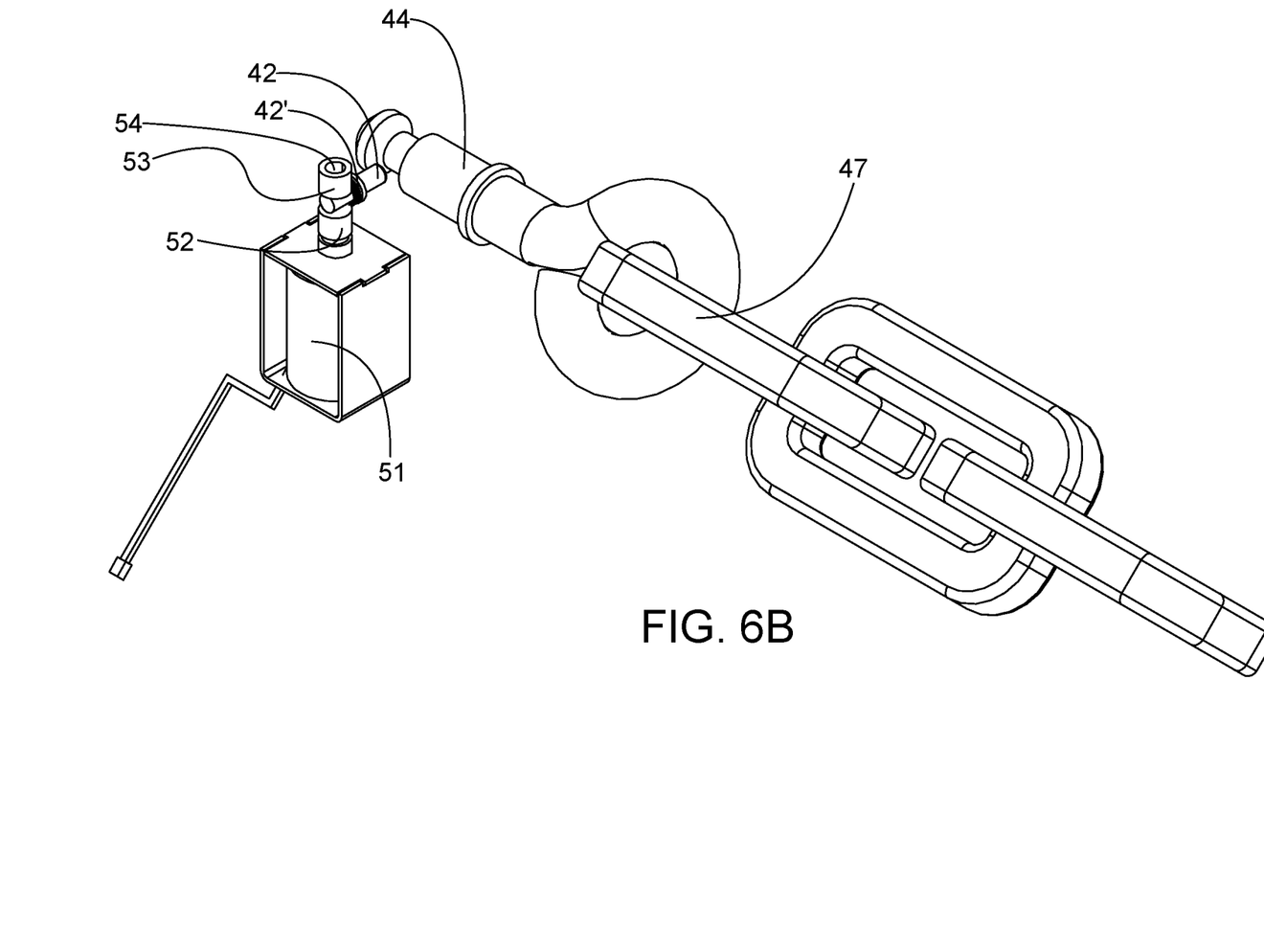

The primary locking pin 42 is held in the locking position thereof by housing 53 of magnet 54 of the solenoid (see also FIG. 6). When actuated, solenoid 51 pushes magnet 54 with the associated housing 53 away from pin 52 of the solenoid. Primary locking pin 42 can therefore, when actuated, move between pin 52 of the solenoid and magnet 54. The locking of insertion pin 44 is in this case released and ejector member 41 pushes the insertion pin out of the channel, at least until stop 46 reaches the primary locking pin 42 (position FIG. 5A).

Figure 7A:
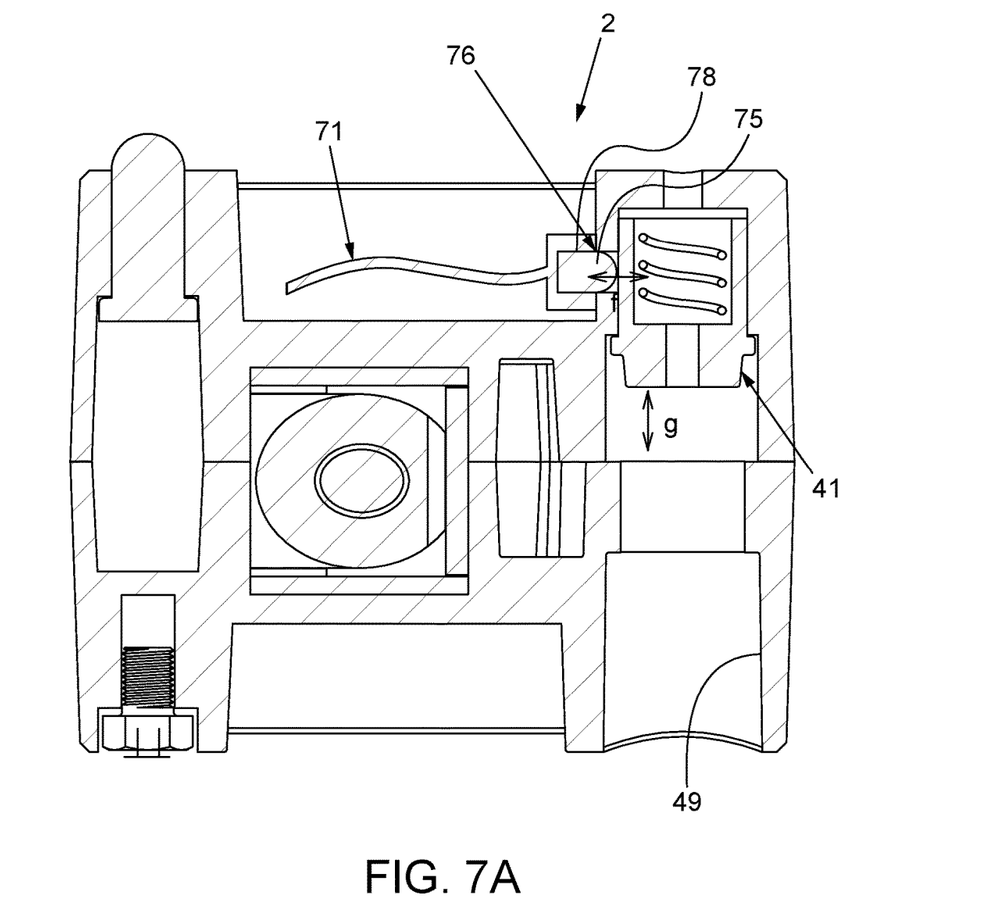
FIGS. 7A and B are cross-sectional views comprising an indicator for indicating the presence of an insertion member in the insertion channel as according to two further preferred embodiments.

Provided in a further preferred embodiment for the purpose of indicating the presence of the insertion member in the insertion channel is a switch 76 (FIG. 7) comprising an actuating element 75 arranged in a channel 78. Actuating element 75 is reciprocally movable in the direction of arrow F. When ejector member 41 is situated in the shown position, actuating element 75 is located in the channel, whereby an indication is given by means of a switch 78 that an insertion member is located in the insertion channel, since the ejector member is situated in the pressed situation as shown in FIG. 7A. When ejector member 41 is moved outward, actuating element 75 moves partially out of channel 78, whereby the switch is switched and an indication is given that an insertion member is not present in the insertion channel.

Figure 7B:
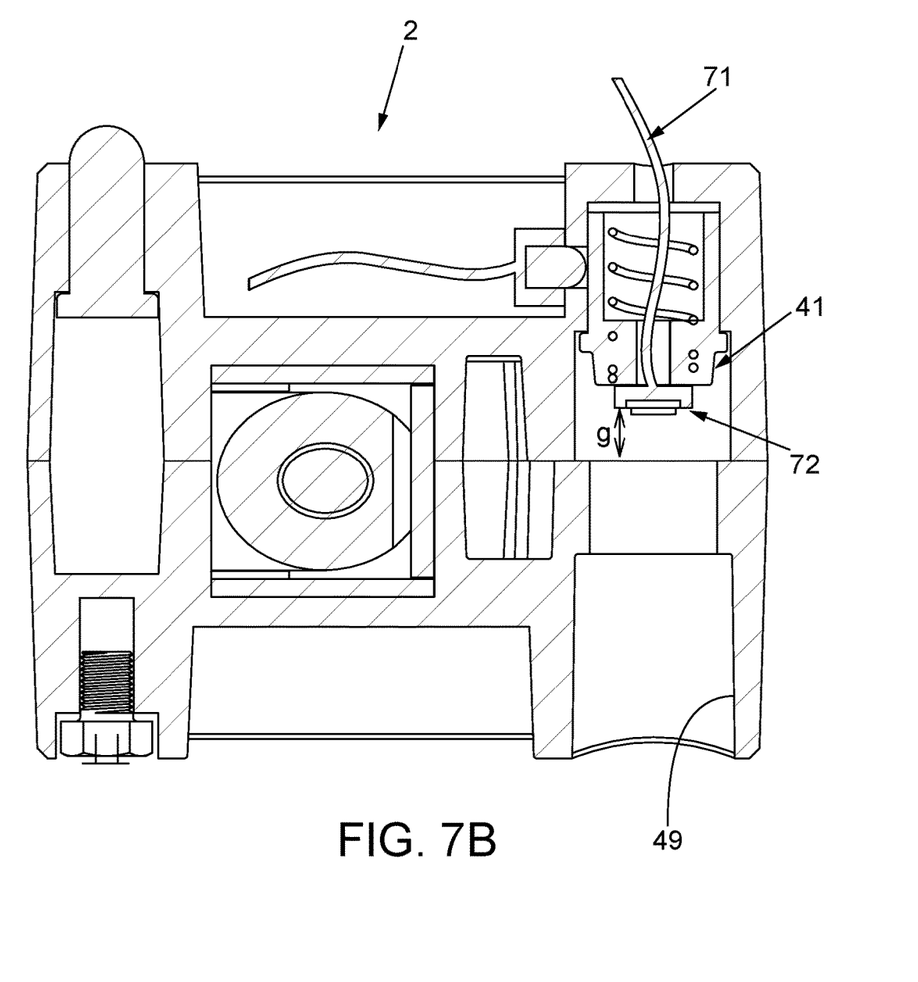

The variant according to FIG. 7B functions in that, when the insertion member is arranged in the insertion channel, it presses against switch 72. The presence of the insertion member in the insertion channel is hereby indicated. In both variants the signal from the switch is conducted by means of cable 71, either directly to the on-board computer or by means of the connection 23 according to FIG. 1.

Method for providing users access to a cycle, preferably comprising a cycle lock according to the present invention, the method comprising steps for:

receiving from a communication device a request for user access to a cycle comprising such a lock, determining a suitable cycle to be made available, such as one available nearby, transmitting access rights for the relevant cycle to the communication device.

Such a method more preferably comprises steps for updating on a regular basis location information of a number of such cycles.

Cycle lock with electrical actuation for opening thereof on the basis of a user authentication or user authentication information, wearing the authentication is preferably received by means of a wireless receiver, preferably a wireless NFC or Bluetooth receiver, which is more preferably connected to or arranged in the lock.

The present invention has been described in the foregoing on the basis of several preferred embodiments. Different aspects of different embodiments are deemed described in combination with each other, wherein all combinations which can be deemed by a skilled person in the field as falling within the scope of the invention on the basis of reading of this document are included. These preferred embodiments are not limitative for the scope of protection of this document. The rights sought are defined in the appended claims.

The invention claimed is:

1. A cycle frame insertion lock with electrical actuation suitable or configured for co-action with a cycle on-board computer arranged within the cycle frame and comprising a power supply, such as a battery, configured to provide a user with feedback and user access to the cycle, the cycle frame insertion lock comprising:

a lock body, comprising:
an insertion member receiving assembly comprising an insertion channel for receiving an insertion member,
a lock associated with the lock body for locking the insertion member in the insertion channel,
an actuator for actuating the lock, and
a connector for connecting the actuator to the cycle on-board computer, wherein the actuator is actuated in response to receiving an actuating signal from the cycle on-board computer, wherein
the lock body is configured to be disposed within the cycle frame, preferably the top tube of the frame, the lock body distinct from the cycle on board computer, and the actuator is configured to cause the lock to release the insertion member in response to receiving electrical energy controlled from the cycle on-board computer.

2. The cycle frame insertion lock as claimed in claim 1, wherein the actuator is configured to cause the lock to fix the insertion member while in a voltage-free state.

3. The cycle frame insertion lock as claimed in claim 1, further comprising an insertion member ejector member configured to eject the insertion member from the lock body.

4. The cycle frame insertion lock as claimed in claim 1, wherein the actuator is a solenoid for providing a path of movement for the locking means.

5. The cycle frame insertion lock as claimed in claim 1, wherein the lock includes a direct locking member and an indirect locking member.

6. The cycle frame insertion lock as claimed in claim 5, wherein the indirect locking member cooperates with the direct locking member in order to hold the direct locking member in a position to fix an insertion pin in place.

7. The cycle frame insertion lock as claimed in claim 5, wherein the indirect locking member comprises a magnetic housing.

8. The cycle frame insertion lock as claimed in claim 1, wherein the lock body is shaped so as to substantially correspond to an inner surface of a cycle frame tube, preferably having a substantially cylindrical shape or a substantially beam shape.

9. The cycle frame insertion lock as claimed in claim 1, further comprising a surface guide slot for guiding a cable along the lock body.

10. The cycle frame insertion lock as claimed in claim 1, further comprising a screw configured to fix the lock body in a cycle frame tube while aligning the insertion channel with an insertion member feed opening of the cycle frame tube.

11. The cycle frame insertion lock as claimed in claim 1, further comprising at least one fixation pin or a biasing pin configured to maintain a position of the cycle frame insertion lock relative to a cycle frame tube.

12. The cycle frame insertion lock as claimed in claim 1, wherein the lock body is constructed from two or more shells.

13. The cycle frame insertion lock as claimed in claim 5, further comprising an insertion member ejector member including a stop for orienting the lock or the indirect locking member in a predetermined position relative to the insertion channel.

14. The cycle frame insertion lock as claimed in claim 5, further comprising an insertion member ejector member including a stop for orienting the insertion member ejector member in a pre-determined position relative to the insertion channel.

15. The cycle frame insertion lock as claimed in claim 1, further comprising an indicator, preferably embodied by means of a switch, for indicating the presence of the insertion member in the insertion channel.

16. A cycle on-board computer arranged within the cycle frame and comprising a power supply, such as a battery, with user access functions configured to provide a user with feedback and to control a cycle frame insertion lock as claimed in claim 1, comprising:
- a processing unit,
- a memory having instructions stored thereon which, when executed by the processing unit, cause the on-board computer to:
- receive access information from a communication device,
- process the access information to determine, on the basis of the access information, whether to output an actuating signal, and
- transmit, via an actuating signal output connector, the actuation signal, the actuation signal being configured to cause the lock to release the insertion member in response to receiving electrical energy, transmission of electrical energy controlled from the cycle on-board computer.

17. The cycle on-board computer as claimed in claim 16, wherein the access information is received from a Bluetooth receiver or an NFC receiver.

18. The cycle on-board computer as claimed in claim 16, further comprising a GPS receiver or a cellular telephony receiver the GPS receiver or the cellular telephony receiver configured to receive respective GPS or cellular telephony signals for the purpose of performing a location determination.

19. The cycle on-board computer as claimed in claim 16, further comprising a power supply, preferably embodied as a connector for a dynamo, such as a hub dynamo, and/or a power supply connector, such as a USB connector, such as a micro-USB port or a USB type-C port, more preferably comprising a power storage such as a battery or capacitor.

20. A cycle comprising a cycle frame tube, or a cycle frame tube, comprising a passage opening for carrying therethrough an insertion member and having received therein a cycle frame insertion lock and a cycle on-board computer comprising,
- a processing unit,
- a memory having instructions stored thereon which, when executed by the processing unit, cause the cycle on-board computer to:
- receive access information,
- process the access information to determine, on the basis of the access information, whether to output an actuating signal, and
- transmit the actuation signal,
- wherein the cycle frame insertion lock is mounted with an insertion channel such that the insertion channel is accessible by an insertion member through the passage opening.

21. The cycle or cycle frame tube as claimed in claim 20, comprising a window for receiving or showing a display of the on-board computer.

22. A mobile communication device with control functions for controlling a cycle on-board computer as claimed in claim 16.

* * * * *

UNITED STATES PATENT AND TRADEMARK OFFICE
CERTIFICATE OF CORRECTION

PATENT NO. : 10,450,019 B2
APPLICATION NO. : 15/558018
DATED : October 22, 2019
INVENTOR(S) : Ties Jonan Carlier It is certified that error appears in the above-identified patent and that said Letters Patent is hereby corrected as shown below:

In the Claims

Column 6, Lines 34-35, Claim 4, delete "solenoid for providing a path of movement for the locking means." and insert -- solenoid. --

Column 8, Line 1, Claim 18, delete "receiver" and insert -- receiver, --

Signed and Sealed this
Fourth Day of February, 2020

Andrei Iancu
*Director of the United States Patent and Trademark Office*